United States Patent
Davis et al.

(10) Patent No.: US 9,916,108 B2
(45) Date of Patent: Mar. 13, 2018

(54) EFFICIENT LOADING AND STORING OF DATA BETWEEN MEMORY AND REGISTERS USING A DATA STRUCTURE FOR LOAD AND STORE ADDRESSING

(71) Applicant: Imagination Technologies Limited, Kings Langley (GB)

(72) Inventors: Michael John Davis, Bath (GB); Adrian John Anderson, Chepstow (GB); Gary Christopher Wass, St Albans (GB)

(73) Assignee: Imagination Technologies Limited, Kings Langley (GB)

( * ) Notice: Subject to any disclaimer, the term of this patent is extended or adjusted under 35 U.S.C. 154(b) by 145 days.

(21) Appl. No.: 14/847,681

(22) Filed: Sep. 8, 2015

(65) Prior Publication Data

US 2016/0070505 A1 Mar. 10, 2016

(30) Foreign Application Priority Data

Sep. 8, 2014 (GB) .................................. 1415817.4

(51) Int. Cl.
*G06F 3/06* (2006.01)
*G06F 12/02* (2006.01)
(Continued)

(52) U.S. Cl.
CPC ............ *G06F 3/0638* (2013.01); *G06F 3/061* (2013.01); *G06F 3/0673* (2013.01);
(Continued)

(58) Field of Classification Search
None
See application file for complete search history.

(56) References Cited

U.S. PATENT DOCUMENTS 5,696,959 A * 12/1997 Guttag ................ G06F 9/30014
712/225
2008/0082794 A1* 4/2008 Yu .......................... G06F 9/3824
712/218
(Continued)

FOREIGN PATENT DOCUMENTS

EP 0447266 A2 9/1991
WO 2012/077516 A1 6/2012

OTHER PUBLICATIONS

Lecture Slides based on Digital Design and Computer Architecture by David Money Harris and Sarah L. Harris, Chapter 4: Hardware Description Language. 2007 [retrieved from Internet Apr. 30, 2017] url: https://courses.cs.washington.edu/courses/cse467/11wi/lectures/CombVerilog.pdf.*

*Primary Examiner* — Edward Dudek, Jr.
*Assistant Examiner* — Ralph A Verderamo, III
(74) *Attorney, Agent, or Firm* — Vorys, Sater, Seymour and Pease LLP; Vincent M DeLuca

(57) ABSTRACT

Methods and apparatus for efficient loading of data from memory to registers and storing of data from registers to memory are described. In an embodiment, a processor comprises a data structure to which addresses which are used for load operations are pushed. Instead of independently generating addresses for a store operation, addresses are popped from the data structure and either used directly or an optional offset may first be applied to the popped address. In this way, a store operation and a load operation may be performed in parallel because they do not both require use of the logic which independently generates addresses for load/store operations. In various examples, the data structure is a FIFO structure.

20 Claims, 4 Drawing Sheets

(51) Int. Cl.
*G06F 9/30* (2006.01)
*G06F 9/38* (2006.01)

(52) U.S. Cl.
CPC ............ *G06F 9/30043* (2013.01); *G06F 9/38* (2013.01); *G06F 12/02* (2013.01); *G06F 12/0207* (2013.01); *G06F 2212/1028* (2013.01); *G06F 2212/1041* (2013.01); *Y02B 60/1225* (2013.01)

(56) References Cited

U.S. PATENT DOCUMENTS

| | | | | |
|---|---|---|---|---|
| 2014/0122847 | A1* | 5/2014 | Henry | G06F 9/4401 712/243 |
| 2014/0195776 | A1* | 7/2014 | Stewart | G06F 9/3012 712/7 |
| 2015/0309792 | A1* | 10/2015 | Meier | G06F 9/30043 712/225 |

* cited by examiner

EFFICIENT LOADING AND STORING OF DATA BETWEEN MEMORY AND REGISTERS USING A DATA STRUCTURE FOR LOAD AND STORE ADDRESSING

BACKGROUND

It is often desired that processors support concurrent independent data loads and stores (e.g. from memory to registers and vice versa). A known solution to this is to use multiple address units so that load addresses and store addresses can be calculated (and hence used for load and store operations) in parallel. However, adding multiple address units increases the physical size of a processor (e.g. in terms of silicon area) and this in turn increases the cost of the processor. Furthermore, when adding additional address units, additional instruction information is required to control the extra address units which results in increased instruction decode logic and increased storage requirements for the instructions (e.g. more code RAM is required). This further increases the silicon area required for the processor.

The embodiments described below are provided by way of example only and are not limiting of implementations which solve any or all of the disadvantages of known processors and known methods of loading and storing data from/to memory.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatus for efficient loading of data from memory to registers and storing of data from registers to memory are described. In an embodiment, a processor comprises a data structure to which addresses that are used for load operations are pushed. Instead of independently generating addresses for a store operation, addresses are popped from the data structure and either used directly or an optional offset may first be applied to the popped address. In this way, a store operation and a load operation may be performed in parallel because they do not both require use of the logic which independently generates addresses for load/store operations. In various examples, the data structure is a FIFO structure.

A first aspect provides a method of generating one or more addresses for a data store operation in a processor. The method, in response to a data load instruction, stores one or more addresses generated for the data load instruction in a data structure. In response to a data store instruction, the method accesses one or more stored addresses in the data structure and determines one or more addresses for use in a data store operation triggered by the data store instruction. The one or more addresses for use in the data store operation are determined based on the one or more accessed addresses.

A second aspect provides a processor that includes a data structure arranged to store one or more addresses generated in response to data load instructions. The processor also includes a store address logic arranged, in response to a data store instruction, to access one or more stored addresses from the data structure and to determine one or more addresses for use in a data store operation triggered by the data store instruction. The one or more addresses for use in the data store operation are determined based on the one or more accessed addresses.

Further aspects provide a computer readable storage medium having encoded thereon computer readable program code for generating a processor as described herein and a computer readable storage medium having encoded thereon computer readable program code for generating a processor configured to perform any of the methods described herein.

The preferred features may be combined as appropriate, as would be apparent to an ordinarily skilled person, and may be combined with any of the aspects of the invention.

BRIEF DESCRIPTION OF THE DRAWINGS

Embodiments of the invention will be described, by way of example, with reference to the following drawings, in which.

Figure 1:
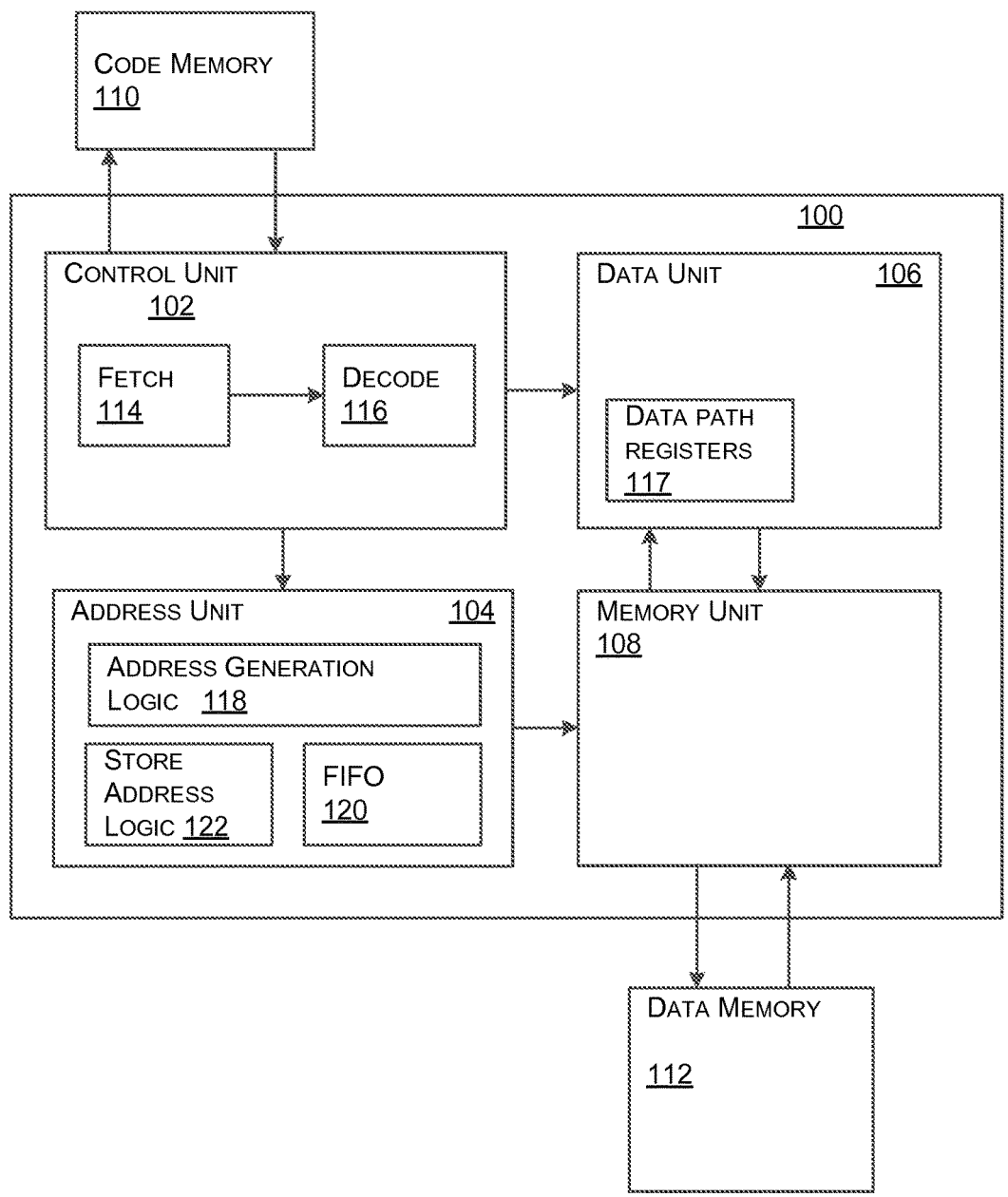
FIG. 1 shows a schematic diagram of an example processor in which the methods described herein may be implemented.

Common reference numerals are used throughout the figures to indicate similar features.

DETAILED DESCRIPTION

Various example embodiments of the present invention are described below by way of example. These examples represent various ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, a solution to enabling concurrent independent data loads and stores within a processor is to use multiple address units, so that in any cycle different address units can independently calculate memory addresses for use in a load or a store operation (e.g. loading from memory into registers or storing from registers into memory). This however results in increased silicon area as a result of the additional address units and further leads to an increase in instruction information. The increase in instruction information also impacts silicon area because it requires increased instruction decode logic and more RAM to store the instructions. Increasing the physical size of a processor is typically undesirable because it increases cost and goes against a general desire to reduce the size of devices which contain processors (e.g. set-top boxes, digital radios and TVs, mobile telephones, tablet computers, etc.) and/or to add more functionality to a chip/device without increasing size.

Described herein are methods and apparatus which enable a load and a store to be executed concurrently without requiring an additional (e.g. a second) address unit. As described in more detail below, this is achieved by re-using the address (or address sequence) generated during a data load operation in a subsequent data store operation. For example, an algorithm which is implemented by a processor may read a data element from memory (e.g. from address A) into registers, input the data element into some arithmetic operations and then write the result from the registers back to the location from which the data element was originally read (e.g. to address A in memory). Instead of using an address unit to generate the load address (address A) at the time of the load operation and an address unit to generate the store address (address A) subsequently at the time of the corresponding store operation, the load address is stored in a data structure such as a FIFO (first-in first-out) data structure and then read back from the data structure (e.g. from the FIFO) when performing the corresponding store operation. Whilst this describes an in-place type operation (i.e. where the store address is the same as the load address), the methods can also be used for copy-type operations (i.e. where the store address is not the same as the load address, but can be generated easily from the load address).

The description of the methods refers to corresponding load and store instructions. A load and a store instruction are considered to be "corresponding" if the load instruction loads some data and the store instruction stores the result of processing that data. For example, where the data unit takes 4 cycles to execute, and the load operation occurs in cycle 0, the data unit executes in cycles 1-4 and the corresponding store operation occurs in cycle 5.

FIG. 1 shows a schematic diagram of an example processor 100 in which the methods described herein may be implemented. In this example, the processor 100 is a single-threaded processor, however, the methods are also applicable to multi-threaded processors.

The processor 100 comprises a control unit 102, an address unit 104, a data unit 106 and a memory unit 108. FIG. 1 also shows a code (or instruction) memory 110 and a data memory 112 external to the processor 100; however, it will be appreciated that these memories may be combined into a single memory for both data and code. Furthermore, the code memory 110 and/or the data memory 112 may be included within the processor 100 and/or included on the same chip as the processor 100.

The control unit 102 fetches and decodes instructions stored in the code memory 110 and so may be described as implementing a fetch stage 114 and a decode stage 116. The control unit 102 is configured to fetch instructions from a program (in program order) as indicated by a program counter (PC). Once an instruction is fetched (e.g. by fetch stage 114) the control unit 102 is arranged to interpret the instructions (e.g. in the decode stage 116). In particular, each instruction may comprise one or more register write operations; one or more register read operations; and/or one or more arithmetic or logical operations. A register write operation, which may also be referred to as a load operation, writes to a destination register. A register read operation reads from a source register. The source and destination registers 117 may be located within the data unit 106 and may also be referred to as data path registers. There may also be registers within the address unit 104 and control unit 102 which may be used to store various parameters used in the operation of the processor 100 and/or the parameters may be held in data memory 112. For read/write operations, the instruction is dispatched by the control unit 102 to a load/store unit implemented within the memory unit 108 and the addresses used for the read/write (or load/store) operations are generated within the address unit 104. For arithmetic or logical operations, the instruction is dispatched by the control unit 102 to the data unit 106 (which may also be referred to as the data path functional unit) for execution (using data which has previously been loaded into registers).

The address unit 104 is responsible for performing all memory to register and register to memory transfers of data (e.g. transfers to and from data memory 112). As shown in FIG. 1, the address unit 104 comprises address generation logic 118 which is used to generate an address in memory (e.g. in data memory 112) for a load/store operation as understood by those of ordinary skill in the art. The address unit 104 in processor 100 further comprises a data structure 120 (which in this example is a FIFO structure) which is arranged to store addresses associated with load operations (referred to as 'load addresses' and as generated by the address generation logic 118). The address unit 104 further comprises store address logic 122 which is arranged to use stored load addresses from the FIFO structure 120 to generate addresses (referred to as 'store addresses') for subsequent store instructions. The load and store addresses are addresses in the data memory 112. Some common address units would, in contrast, comprise the address generation logic 118 but would not comprise either the data structure 120 or the store address logic 122.

The store address logic 122 is not the same as (e.g. is not a duplicate of) the address generation logic 118 and in contrast to the address generation logic 118, is not capable of independently generating a new memory address for an instruction (e.g. a store or a load instruction). Instead, the store address logic 122 determines a store address based on a load address which is stored in the data structure 120 (and for in-place type operations, the store address is the same as the stored load address). The store address logic 122 is consequently much less complex (and hence smaller) than the address generation logic 118 and can operate independently and in parallel with the address generation logic 118. The operation of the data structure 120 and store address logic 122 is described in more detail below with reference to FIGS. 2 and 3. In its least complex (and hence smallest) form, the store address logic 122 may implement a single add operation.

It will be appreciated that in various examples processor 100 may also comprise functional elements other than those shown in FIG. 1 (e.g. caches, etc.) and/or one or more of the functional elements shown in FIG. 1 may be omitted. Although FIG. 1 shows the FIFO 120 and store address logic 122 within the address unit 104, in other examples, one or both of these functional elements may be located outside of the address unit 104.

Although FIG. 1 and the following description refers to the data structure used to store load addresses as a FIFO, this is just one implementation of a data structure which may be used. When using a FIFO, addresses are pushed into the FIFO (i.e. stored in the FIFO) and then popped (i.e. removed when they are accessed) in exactly the same order as they were stored and hence there is no need to add an index or other parameter to indicate an order in which the entries in the FIFO should be read (it is the oldest entry in the FIFO which is always used). In other examples, a buffer may be used which stores addresses and a parameter associated with each entry and the parameter is used to identify the order in which addresses were stored (and hence the order in which the addresses should be read).

The FIFO storage may be implemented using any suitable technology, e.g. an array of flip-flops or RAMs. Where RAMs are used, in various examples, a RAM per address may be used as this reduces power if fewer than the maximum number of parallel store operations are commonly performed. Such an implementation would, however, still maintain a common FIFO pointer/counter logic.

Figure 2:
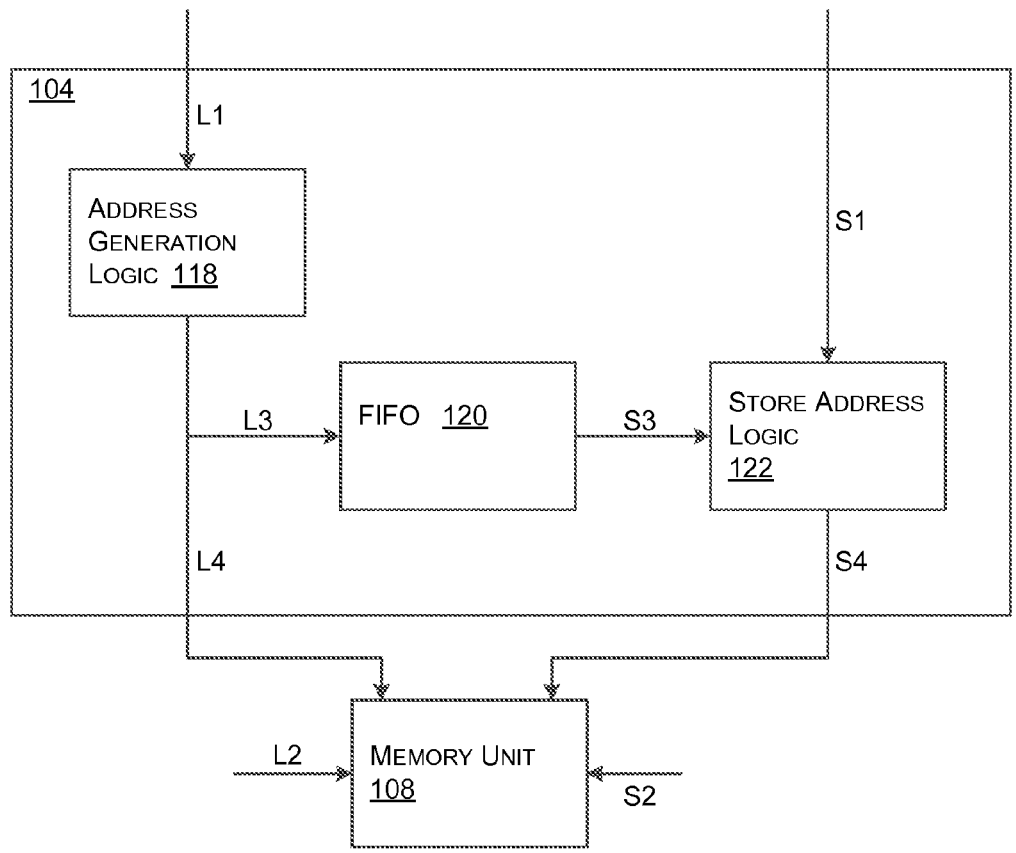
FIG. 2 is a schematic diagram showing an address unit in more detail.
Figure 3:
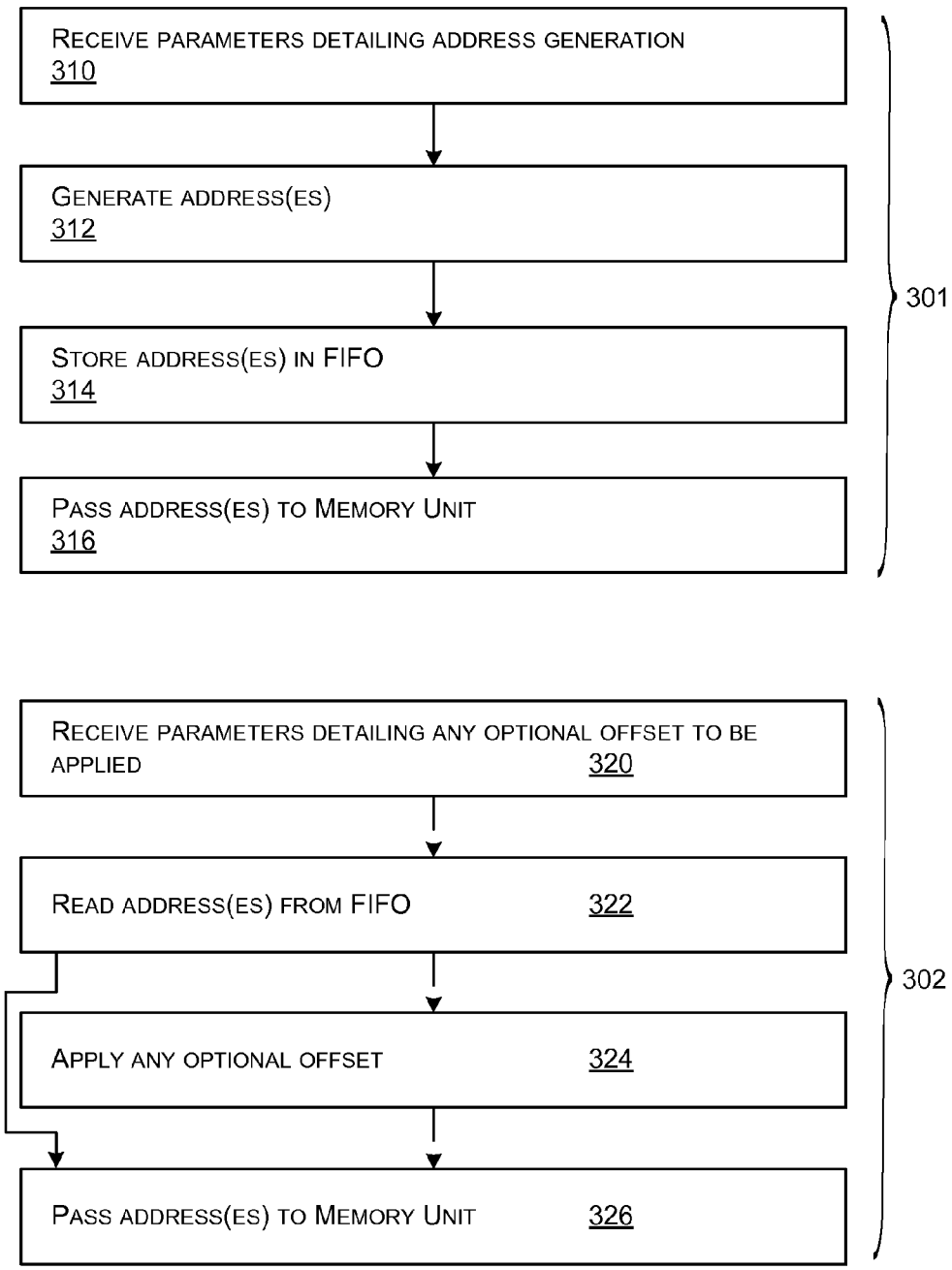
FIG. 3 is a flow diagram showing example methods of operation of an address unit for both load instructions and store instructions.

FIG. 2 is a schematic diagram showing the address unit 104 in more detail and FIG. 3 is a flow diagram showing example methods of operation of the address unit 104 for both load instructions 301 and store instructions 302.

On a load instruction (as shown in method 301), the parameters detailing the address generation are received, in the standard way, by the address generation logic 118 (block 310 and arrow L1). These parameters (which may include a number of addresses to be generated) are used by the address generation logic 118 to generate one or more addresses (block 312) as understood by one of ordinary skill in the art. These addresses are then stored in (e.g. pushed to) the FIFO structure (block 314 and arrow L3) and passed to the memory unit 108 (block 316 and arrow L4). The memory unit 108 uses the addresses received (arrow L4) and parameters detailing the destination register(s) to which the data is to be loaded (arrow L2) to perform the load operation. In various examples, these parameters detailing the destination register(s) may be passed from the address unit 104 to the memory unit 108.

On a store instruction (as shown in method 302), an entry comprising one or more addresses is read from (e.g. popped from) the FIFO 120 (block 322 and arrow S3) by the store address logic 122 and passed to the memory unit 108 (block 326 and arrow S4). The memory unit 108 uses the address(es) received (arrow S4) and parameters detailing the source register(s) containing the data to store (arrow S2) to perform the store operation. This may be described as an 'in-place' type operation as the store operation stores data at the address(es) stored in the accessed FIFO entry.

In various examples, a 'copy type' operation may be implemented (instead of or in addition to in-place type operations). In a copy-type store operation the data is stored at an address (in data memory 112) which is not the same as the address stored in the accessed FIFO entry; however a store address is determined by applying an offset to an address in the FIFO entry. In such examples, the method 302 further comprises receiving parameters identifying any optional offset to be applied (block 320 and arrow S1) and then applying any optional offset to the address(es) which have been read from the FIFO 120 (block 324). The offset is received and applied by the store address logic 122 within the address unit 104 and then the address(es) with any optional offset applied are passed to the memory unit 108 (block 326 and arrow S4). As before, the memory unit 108 uses the address(es) received (arrow S4) and parameters detailing the source register(s) containing the data to store (arrow S2) to perform the store operation.

It will be appreciated that in various examples, parameters detailing any optional offset may only be received (in block 320) where the offset is non-zero and in other examples, these parameters may always be received and in examples where an in-place type operation is required, the parameters may indicate that no offset is required (e.g. they may detail an offset which is equal to zero).

By using the methods shown in FIG. 3 and the FIFO 120 (or alternative form of data structure) and store address logic 122 shown in FIG. 2, a load operation and a store operation can be implemented in parallel (providing that the memory unit 108 is capable of parallel operation) as the address generation logic 118 is not required for both operations. In the methods shown in FIG. 3, whilst a load address and a store address are identified in the same cycle, only one of these addresses (the load address) is generated independently (i.e. without reference to another previously generated load/store address) and the other (the store address) is generated based on a previously generated load address (i.e. based on a previous output of the address generation logic 118).

Figure 4:
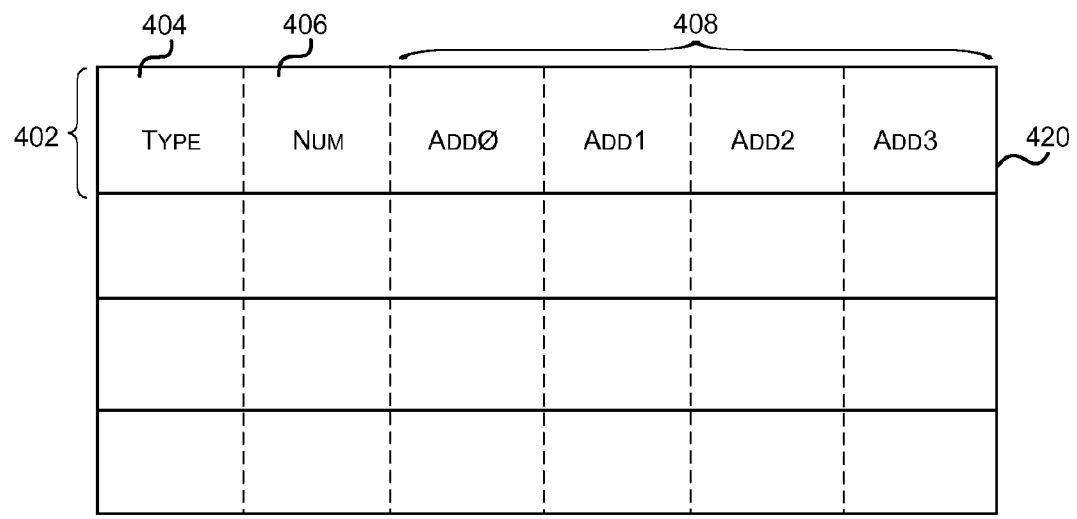
FIG. 4 is a schematic diagram showing two example FIFO structures.
Figure 4:
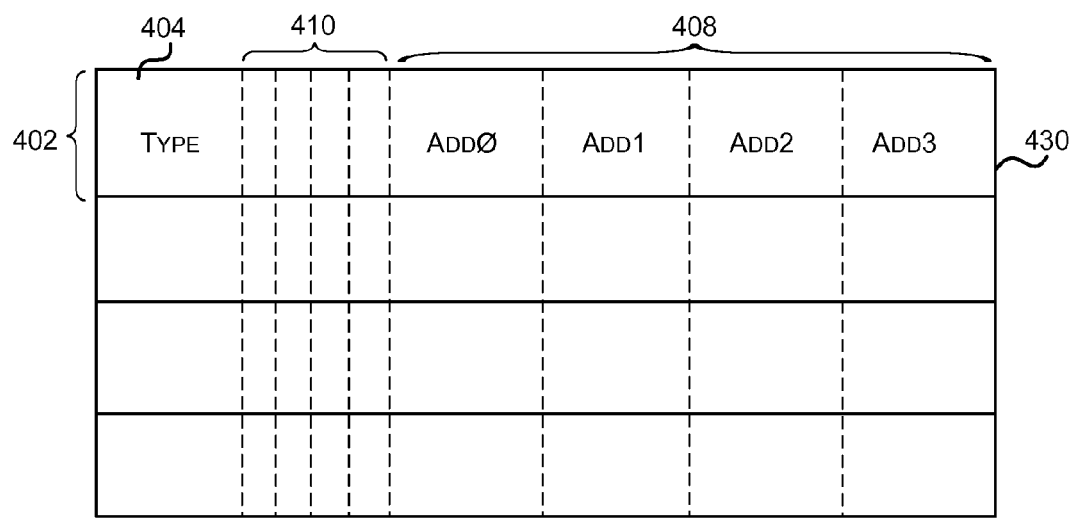

In various examples, each FIFO entry may comprise a single load address. However, in other examples a FIFO entry may comprise one or more addresses and two example FIFOs 420, 430 are shown in FIG. 4. In the first example FIFO 420 shown in FIG. 4, each entry 402 comprises a number of fields: a type field 404, a number field 406 and a plurality of address fields 408. The type field 404 indicates a data type, which may for example be 'complex' (e.g. complex data comprising real/imaginary pairs) or 'double' (i.e. double-precision real only data). The number field 406 indicates the number of address fields which are valid (e.g. where there may be a different number of valid addresses in different entries in the FIFO) and each address field is capable of storing one address (where each address is an address in the data memory 112). The data type and the number of addresses (which are stored in fields 404, 406) may be provided to the address generation logic 118 as parameters which detail the address generation process (in block 310 in FIG. 3 and arrow L1 in FIG. 2).

In the first example shown in FIG. 4, FIFO 420 comprises four entries and four address fields; however, it will be appreciated that a FIFO may comprise more or fewer entries and/or address fields in each entry and may not comprise all the fields shown (e.g. the type and/or number fields may be omitted). The number of addresses in a sequence which are generated by the address generation logic 118 (in block 312) and saved in an entry in the FIFO (in block 314) may be dependent upon the structure of the data unit 106. In a second example FIFO 430 shown in FIG. 4, the number field 406 is omitted and instead there is a valid bit 410 for each address field 408. Whilst fewer (log 2) FIFO storage bits are used in the first example to encode a number field 406 compared to using individual valid bits 410, more decode/encode logic is needed to decode the number field 460.

In the second example shown in FIG. 4, FIFO 430 also comprises four entries and four address fields; however, it will be appreciated that a FIFO may comprise more or fewer entries and/or address fields in each entry and may not comprise all the fields shown (e.g. the type field may be omitted). As described above, the number of addresses in a sequence which are generated by the address generation logic 118 (in block 312) and saved in an entry in the FIFO (in block 314) may be dependent upon the structure of the data unit 106.

Although the example FIFOs 420, 430 shown in FIG. 4 are capable of storing a plurality of addresses, in various examples, a FIFO may only be capable of storing a single address (e.g. for a processor architecture that performs single parallel load store operations).

In various examples, the data unit 106 shown in FIG. 1 may support operations on input data arranged as four columns (i.e. it is a Single Input Multiple Data, SIMD, unit). In response to a load instruction, four addresses are generated (in block 312) and these four addresses are stored (in block 314) in four address fields 408 in the same entry 402 in the FIFO (e.g. in fields ADD0-ADD3 in FIG. 4). In response to a corresponding store instruction, four stored addresses are read from a single entry in the FIFO (in block 322), any optional offset is applied to each of the four addresses (in block 324) and the resultant addresses are passed to the memory unit 108 for use (in block 326). This results in four parallel store operations being performed in a single cycle. In other examples, the data unit 106 may be a SIMD unit which operates on input data arranged as a different number of columns (e.g. N columns, where N is a natural number) and so there may be a different number of address fields 408 (e.g. N address fields) in each entry in the FIFO. The number of address fields which are used in any entry in the FIFO may be the same in all entries (in which case the number field may be omitted in some examples) or may vary.

In order to implement the load instruction method 301 shown in FIG. 3, the load instruction may be modified to implement the push of the addresses to the FIFO as well as loading data items to registers from memory. A generalized example description of such a modified load instruction is shown below, with the underlined entries being the additional parts of the description which relate to the use of a FIFO:

---
Establish data entry and populate type and number (num) fields
For c = 0 to (num−1):
    Generate address
    Store item from address in destination register
    Store address in next address field in data entry
End
Push populated data entry into FIFO

---

In this example, the 'generate address' part of the instruction may include different ways to generate the address depending upon the data type. Furthermore, where num>1 (i.e. each FIFO entry comprises multiple addresses), the addresses may be generated based on parameters such as a base address, a stride (e.g. which determines whether consecutive addresses or alternate addresses, etc. are used) and an increment (e.g. which is used to generate a modified base address for the next address sequence), where these parameters are provided to the address generation unit 118 as part of the instruction (arrow L1 in FIG. 2). In other examples, instead of using a stride (which implies a fixed spacing between data items in the memory), the addresses may be generated based on parameters such as a base address, a set of offsets (where the offset for each address in the sequence is specified independently and an increment). For example, where a stride of 2 is used, the load addresses in a sequence may be [base address, base address +2, base address +4, base address +6]; however, where offsets of [0, 1, 3, 6] are defined, the load addresses in a sequence may be [base address, base address +1, base address +3, base address +6].

In some examples, the data unit may operate on only a proper subset of the entries in a data vector (e.g. 4 items from a data vector, where the data vector may comprise many more items, e.g. 100 data items) and in which case the modified store instruction may be executed multiple times for a single data vector (e.g. 25 times for data items 0-3, 4-7, . . . , 96-99 respectively). In such an example, a load and a store operation in the same cycle may operate on different items from the same data vector. For example, where the data unit takes 3 cycles to execute, the data items within a vector may be processed as follows:

| Cycle | Load (& Store Address in FIFO) | Execute 1 | Execute 2 | Execute 3 | Store (using addresses from FIFO) |
|---|---|---|---|---|---|
| 0 | 0-3 | | | | No valid data to store |
| 1 | 4-7 | 0-3 | | | No valid data to store |
| 2 | 8-11 | 4-7 | 0-3 | | No valid data to store |
| 3 | 12-15 | 8-11 | 4-7 | 0-3 | No valid data to store |
| 4 | 16-19 | 12-15 | 8-11 | 4-7 | 0-3 |
| ... | ... | ... | ... | ... | ... |
| 99 | 96-99 | 92-95 | 88-91 | 84-87 | 80-83 |
| 100 | No valid data to load | 96-99 | 92-95 | 88-91 | 84-87 |
| 101 | No valid data to load | No valid data to load | 96-99 | 92-95 | 88-91 |
| 102 | No valid data to load | No valid data to load | No valid data to load | 96-99 | 92-95 |
| 103 | No valid data to load | No valid data to load | No valid data to load | No valid data to load | 96-99 |

As can be seen from the table above, in cycle 0 the load addresses for data items 0-3 in the data vector are generated and stored in the first entry of the FIFO and the corresponding store instruction, which uses the stored load addresses for data items 0-3, occurs in cycle 4. Stores may be suppressed for cycles 0-3 as there is no valid output data from the data unit and this is described further below. When stores are suppressed, the popping of addresses from the FIFO is also suppressed.

In cycles 100-103 data items from the data vector are still being used and entries may still be being pushed to the FIFO (e.g. a loop may contain surplus load operations). Where this occurs, the store operations at the start of the loop (cycles 0-3) are inhibited and the FIFO is flushed (i.e. emptied) before it is next used (e.g. at the end of this data vector or the start of the next data vector) so that the FIFO does not contain any invalid or incorrect addresses from the surplus load operations (in cycles 100-103). In various examples, a dedicated instruction may be used to flush the FIFO.

In order to implement the store instruction method 302 shown in FIG. 3, the store instruction is modified to use addresses from the FIFO rather than to generate new addresses (as is done in the load instruction and as would be done in a known store instruction). For the modified store instruction, instead of adding new parts to the description (as in the case of the modified load instruction described above), the modified store instruction is a much reduced instruction (e.g. comprising only 4 bits in various examples) as the parameters which are usually required in order to be able to generate the store addresses (e.g. type, number, base address, stride, increment) are no longer required. A generalized example description of such a modified store instruction is shown below:

---
If SHO==0
    Read next entry from FIFO
    Extract type and num from FIFO entry
    For c = 0 to (num−1):
        Extract next address from FIFO entry
        Apply any optional offset to extracted address
        Store item from source register to modified address
    End
End In this example, the parameters which are needed as part of the instruction are details of the source registers and any optional offset. However, the parameters may be further reduced by limiting the store instruction to only read from a single set of data path registers within the data unit 106 and in various such examples, the only parameter which is required as part of the modified store instruction is the identifier of a register containing the actual address offset and as the offset is optional, this may not always be used.

The store hold off (SHO) parameter in the above example store instruction is used to nullify the store operation until real data exists within the source registers (e.g. with the store operation being nullified where the parameter has a non-zero value). Referring back to the example shown in the table above, the SHO parameter may be non-zero for cycles 0-3 in order that these stores are not performed (e.g. the SHO parameter may be initialized to a value of 4 before the loop and then decremented at the end of every iteration until it reaches zero). It will be appreciated that in various examples, a SHO parameter may not be required and this part of the example store instruction above may be omitted.

In a variation of the methods described herein, a greater separation in time of the loads and stores may be enabled through the use of a FIFO with a larger depth (i.e. a larger number of entries).

In various examples, a look-up table may be used to enable variable offsets to be added with the look-up operation being implemented (and the offset added) either before the store (e.g. with block 324 being positioned between blocks 312 and 314 in FIG. 3 instead of the position shown) or after the address has been popped from the FIFO (e.g. block 324 following block 322 as shown in FIG. 3).

In an example which uses a look-up table, the FIFO stores relative load indexes (instead of absolute addresses, as described above) and the look-up table is used to map the stored load indexes (in the FIFO) to re-ordered store addresses. The depth of the look-up table used matches (or is bigger than) the load fetch latency and the look-up operation may be implemented either during load address generation with the resultant index being pushed onto the FIFO (e.g. the look-up is performed between blocks 312 and 314 in FIG. 3) or it could be performed on values popped from the FIFO during store addressing (e.g. after block 322 and before block 324/326 in FIG. 3). By performing the look-up (in the look-up table) during load addressing (i.e. in the first option), this keeps store addressing simple (i.e. the use of the look-up table affects the data stored in the FIFO and not the determining of store addresses) and in some cases allows re-use of a look-up table which is already provided for out-of-order load addressing. In various examples, the look-up table may be implemented as logic such as a pseudo-random sequence generator implemented using a linear feedback shift register (LFSR). The LFSR is a shift register that taps current state from various bits and exclusive ORs them together to generate the next input. The sequence from an initial programmed state (or seed) will always be the same. The LFSR can be used to generate a pseudo-random sequence of values that can be added to the addresses in block 324.

The methods and apparatus described herein provide an area and power efficient way of implementing load and store operations in parallel (e.g. a load operation can be performed in parallel with a store operation without requiring a second address unit). The area and power efficiencies are achieved by eliminating the requirement for a second address unit in order to be able to implement a load and a store operation in the same cycle. Use of a second address unit increases the silicon area required and the overall power consumption and, as described above, also requires longer instructions (increasing instruction storage requirements) and additional instruction decode logic.

By enabling a load and a store operation to be implemented in the same cycle, the speed of data processing by the processor is increased (e.g. with only a single address unit, there would be extra delay because a load and a store operation cannot be performed in the same cycle).

The methods described above may be used in processors which use a RISC or load/store architecture, i.e. in those processors where data is moved from memory into a register before the data can be used or manipulated in some way. In various examples, the processor may use software pipelining; however, the methods may also be used in processors which do not use software pipelining within the data path (or data unit). For example, the methods may be applied to hardware pipelines that perform RAM accesses (i.e. to any hardware accelerator, not just processors). In such an example, it may reduce the complexity of RAM write addressing logic.

The processors described above in which the methods are implemented are in-order processors. The methods described may also be modified such that they can be implemented in an out-of-order processor. In an out-of-order processor, a RAM may be used instead of a FIFO. Entries may be written to the RAM on loads in positions relative to the original instruction order and likewise fetched on stores from positions relative to the original instruction order. This may, for example, be achieved by tagging the re-ordered instructions with their original relative positions and then using these tagged values to determine where to store/fetch an entry in the RAM.

The term 'processor' and 'computer' are used herein to refer to any device, or portion thereof, with processing capability such that it can execute instructions. The term 'processor' may, for example, include central processing units (CPUs), radio processing units (RPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor of a receiver as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of generating one or more addresses for a data store operation in a processor, the method comprising:
    in response to a data load instruction which has been fetched from a program, generating and storing one or more addresses for the data load instruction in a data structure; and
    in response to a data store instruction which has been fetched from a program,
        accessing one or more stored addresses in the data structure, wherein the one or more stored addresses accessed in response to the data store instruction were previously generated by an address unit in the processor and stored in the data structure in response to a corresponding and separate data load instruction, and
        determining one or more addresses for use in a data store operation triggered by the data store instruction, wherein the one or more addresses for use in the data store operation are determined based on the one or more accessed addresses.

2. A method according to claim 1, further comprising: passing the determined one or more addresses for use in the data store operation to a memory unit within the processor.

3. A method according to claim 1, further comprising: receiving a parameter detailing an offset to be applied, and wherein determining the one or more addresses for use in a data store operation based on the one or more accessed addresses comprises:
applying the offset to each of the one or more accessed addresses.

4. A method according to claim 1, wherein the one or more addresses generated for the data load instruction identify data items from a data vector and wherein the method further comprises one or both of:
flushing the data structure prior to storing an address identifying a first data item from a data vector; and
flushing the data structure after accessing, from the data structure, an address identifying a last data item from a data vector.

5. A method according to claim 1, wherein storing one or more addresses generated for the data load instruction in a data structure comprises:
storing a plurality of addresses generated for the data load instruction in a single entry in a data structure.

6. A method according to claim 5, wherein accessing one or more stored addresses in the data structure comprises:
accessing a plurality of stored addresses from a single entry in the data structure.

7. A method according to claim 1, wherein the processor is an out-of-order processor and the data structure is a RAM and wherein:
storing one or more addresses generated for the data load instruction in a data structure comprises storing one or more addresses generated for the data load instruction in a position in the RAM dependent upon a position of the data load instruction in an original order of instructions; and
accessing one or more stored addresses in the data structure comprises accessing one or more stored addresses from a position in the RAM dependent upon a position of the data store instruction in an original order of instructions.

8. A processor comprising:
address generation logic arranged, in response to a data load instruction which has been fetched from a program, to generate one or more addresses for use in a data load operation triggered by the data load instruction;
a data structure arranged to store one or more addresses generated by the address generation logic in response to data load instructions; and
store address logic arranged, in response to a data store instruction which has been fetched from a program, to access one or more stored addresses from the data structure, wherein the one or more stored addresses accessed in response to the data store instruction were previously generated by the address generation logic and stored in the data structure in response to a corresponding and separate data load instruction, and to determine one or more addresses for use in a data store operation triggered by the data store instruction, wherein the one or more addresses for use in the data store operation are determined based on the one or more accessed addresses.

9. A processor according to claim 8, further comprising: an address unit comprising the data structure, the store address logic and the address generation logic.

10. A processor according to claim 8, further comprising: a memory unit arranged to implement data load operations triggered by data load instructions and data store operations using addresses determined by the store address logic.

11. A processor according to claim 8, wherein the store address logic is further arranged to receive a parameter detailing an offset to be applied and is arranged to determine the one or more addresses for use in the data store operation by applying the offset to each of the one or more accessed addresses.

12. A processor according to claim 8, wherein the data structure is arranged to store a plurality of entries each comprising a plurality of address fields, wherein each address field is in an entry is arranged to store one of a plurality of addresses generated from a single data load instruction.

13. A processor according to claim 12, wherein an entry in the data structure further comprises a number field arranged to store a value identifying a number of valid addresses stored in the plurality of address fields.

14. A processor according to claim 8, wherein the store address logic is arranged, in response to a data store instruction, to access a plurality of stored addresses from a single entry in the data structure.

15. A processor according to claim 8, wherein the data structure is a FIFO data structure.

16. A processor according to claim 8, wherein the data structure is a RAM and wherein:
the data structure is arranged to store one or more addresses generated in response to data load instructions at a position in the RAM dependent upon a position of the data load instruction in an original order of instructions; and wherein
the store address logic is arranged, in response to a data store instruction, to access one or more stored addresses from a position in the RAM dependent upon a position of the data store instruction in an original order of instructions and to determine one or more addresses for use in a data store operation triggered by the data store instruction, wherein the one or more addresses for use in the data store operation are determined based on the one or more accessed addresses.

17. A processor according to claim 8, further comprising a data unit arranged to process data loaded via a data load instruction using software pipelining.

18. A processor according to claim 8, wherein the processor is a Radio Processing Unit.

19. A non-transitory computer readable storage medium having stored thereon computer readable instructions that, when processed at a computer system for generating a manifestation of an integrated circuit, cause the computer system to generate a manifestation of a processor, said processor comprising:
address generation logic arranged, in response to a data load instruction which has been fetched from a program, to generate one or more addresses for use in a data load operation triggered by the data load instruction;

a data structure arranged to store one or more addresses generated by the address generation logic in response to data load instructions; and store address logic arranged, in response to a data store instruction which has been fetched from a program, to access one or more stored addresses from the data structure, wherein the one or more stored addresses accessed in response to the data store instruction were previously generated by the address generation logic and stored in the data structure in response to a corresponding and separate data load instruction, and to determine one or more addresses for use in a data store operation triggered by the data store instruction, wherein the one or more addresses for use in the data store operation are determined based on the one or more accessed addresses.

20. A non-transitory computer readable storage medium having stored thereon computer readable instructions that, when processed at a computer system for generating a manifestation of an integrated circuit, cause the computer system to generate a manifestation of a processor configured to:

in response to a data load instruction which has been fetched from a program, generate and store one or more addresses for a data load instruction in a data structure; and in response to a data store instruction which has been fetched from a program, access one or more stored addresses in the data structure, wherein the one or more stored addresses accessed in response to the data store instruction were previously generated by an address unit in the processor and stored in the data structure in response to a corresponding and separate data load instruction, and determine one or more addresses for use in a data store operation triggered by the data store instruction, wherein the one or more addresses for use in the data store operation are determined based on the one or more accessed addresses.

* * * * *